July 7, 1953 M. D. HENTHORN 2,644,288
HARVESTER REEL
Filed Sept. 2, 1950
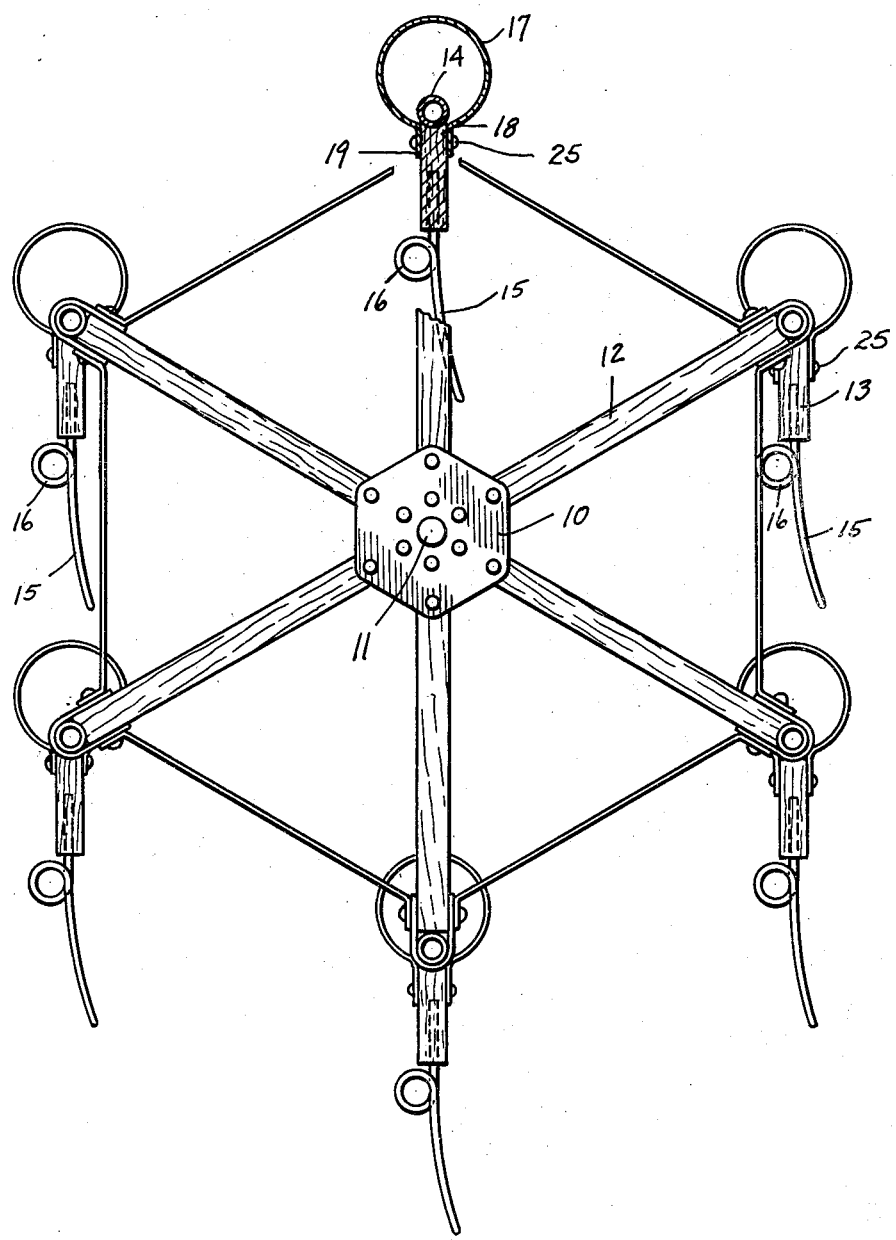
INVENTOR.
MARCUS D. HENTHORN.
BY
Lockwood, Hahn, Galt & Woodard.
ATTORNEYS.

Patented July 7, 1953

2,644,288

UNITED STATES PATENT OFFICE 2,644,288

HARVESTER REEL

Marcus D. Henthorn, Roachdale, Ind.

Application September 2, 1950, Serial No. 182,999

1 Claim. (Cl. 56—220)

The present invention relates to improvements in bat construction for harvester reels employed on harvesting machines in connection with the reciprocating cutter of the sickle type to gather or pick up the crop, transfer it to the sickle and then lift or pass the cut crop to the usual draper or carrier.

The invention is particularly directed to the construction of the bat constituting the grain engaging member of the reel and one of the objects of the invention is to provide a means whereby, during the operation of the reel, the grain will be prevented from becoming hooked on the backs of the reel and thrown over in front of the harvester to be mutilated and cut by the harvester sickle.

For the purpose of disclosing the invention an embodiment of the invention is disclosed in the accompanying drawings in which the figure is a side elevation, parts thereof being shown in section, showing a harvester reel embodying my invention.

In the embodiment illustrated the harvester reel comprises the usual construction in which there is provided hubs 10 adapted to be mounted on a suitable shaft 11, at the opposite ends thereof and each of the hubs supports a plurality of radially disposed arms 12 at the ends of which are supported the bats 13. Each of these bats constitutes a flat strip secured at its upper edge to a bat shaft 14 rotatably mounted on the end of the arms and maintained in position thereon by suitable straps (not shown) at spaced intervals which are looped over the shaft and are secured at their opposite ends on the opposite sides of the bat.

At spaced intervals the bat is provided with tines such as 15 which at their upper end and before being secured to the lower edge of the bat are preferably looped as at 16 for the purpose of adding resiliency to the tines.

A guard protects the upper edge of the bat together with its supporting shaft. This guard comprises a hollow cylindrical sheet metal tubular guard 17 which is slotted as at 18 and provided with flanges 19 adapted to embrace the top edge of the bat and completely enclose the top edge of the bat together with the bat shaft 14. Any suitable securing means 25 may be used to attach the flanges 19 to the upper part of the bat.

By this arrangement as the bat approaches the standing grain the cylindrical guard will engage the top of the grain bending it down before it is engaged by the bat to be pushed into the sickle so that there is no danger of the top of the grain being bent or caught by the top edge of the bat and thrown over in front of the sickle of the harvester on to the ground.

The invention claimed is:

In combination with a harvester reel having a bat rotatably supported at its upper edge in said reel; of a tubular member having a slit in one side thereof extending throughout the length of said member receiving and enclosing the upper edge of said bat, flanges projecting outwardly in parallelism from the edges of said member defining said slit in engagement with both sides of said bat, and securing means connecting said flanges to said bat.

MARCUS D. HENTHORN.

References Cited in the file of this patent

UNITED STATES PATENTS

| Number | Name | Date |
|---|---|---|
| 1,926,538 | Hume et al. | Sept. 12, 1933 |
| 1,996,294 | Hume et al. | Apr. 2, 1935 |
| 2,252,180 | Hume | Aug. 12, 1941 |
| 2,457,490 | Press | Dec. 28, 1948 |